J. A. CLARKE, Jr.
SYSTEM OF CONTROL.
APPLICATION FILED APR. 4, 1916.
1,339,945.
Patented May 11, 1920.
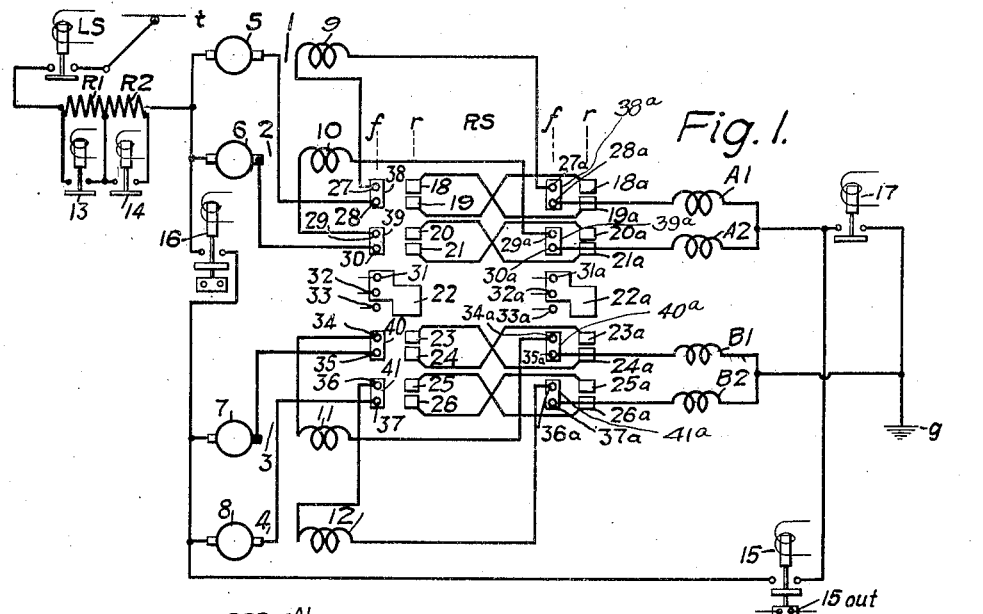
Fig. 1.
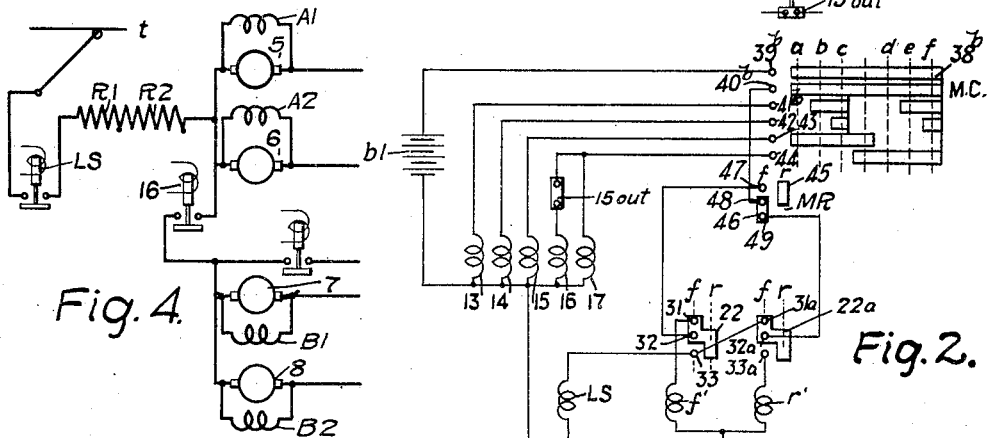
Fig. 4.
Fig. 2.
Fig. 3.
WITNESSES:
INVENTOR
John A. Clarke, Jr.
BY
ATTORNEY

UNITED STATES PATENT OFFICE.

JOHN A. CLARKE, JR., OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,339,945.  Specification of Letters Patent.  Patented May 11, 1920.

Application filed April 4, 1916. Serial No. 88,800.

*To all whom it may concern:*

Be it known that I, JOHN A. CLARKE, Jr., a citizen of the United States, and a resident of Wilkinsburg, in the county of Allegheny and State of Pennsylvania, have invented a new and useful Improvement in Systems of Control, of which the following is a specification.

My invention relates to systems of control for electric vehicles and particularly to systems adapted to effect dynamic braking.

One object of my invention is to provide a control system of the above indicated character that shall insure the separation of the same from a supply circuit while a dynamic braking current is flowing through the motors thereof.

Another object of my invention is to provide a system of the above indicated character with automatic means which shall prevent the operation of the motor reversing means while a dynamic-braking current is flowing through the motors.

A further object of my invention is to provide a system of the above indicated character that shall automatically place the motors in condition for normal operation in case the dynamic-braking current ceases to flow.

More specifically, my invention embodies a system of control having motors adapted to be connected in series-parallel-circuit relation across a supply circuit by means of a line switch. Coils of differential relays are disposed in series-circuit relation with the motors whereby the relays are operated in case a dynamic-braking current flows through the circuits of the motors, but are unaffected by the normal operating currents flowing therethrough. In case the differential relays are operated by a dynamic-braking current flowing through the motors, the circuits through the operating coil of the line switch and through the coils for operating the reversing switch of the motors are opened and maintained in this condition until the dynamic-braking current ceases to flow through the motors.

In the accompanying drawing Figure 1 is a diagrammatic view of the main circuits of a system of control constructed in accordance with my invention; Fig. 2 is a diagrammatic view of the auxiliary control circuits of the system illustrated in Fig. 1; Fig. 3 is a sequence chart indicating the sequence of operation of the various switches shown in Fig. 1, and Fig. 4 is a modification of the system illustrated in Fig. 1.

Referring to Fig. 1 of the drawing, motors 1, 2, 3 and 4, respectively comprising armatures 5, 6, 7 and 8 and field windings 9, 10, 11 and 12, are adapted to be connected across line conductors $t$ and $g$ and to be controlled by unit switches LS, 13, 14, 15, 16 and 17, resistors R1 and R2 and a reversing switch RS.

The reversing switch RS embodies contact segments 18 to 26, inclusive, and $18^a$ to $26^a$, inclusive, which are adapted to engage contact fingers 27 to 30, inclusive, 32 to 37, inclusive, $27^a$ to $30^a$, inclusive, and $32^a$ to $37^a$, inclusive, when the switch is moved to the reversing position, and contact segments 38, 39, 40, 41, $38^a$, $39^a$, $40^a$, $41^a$, which are adapted to engage contact fingers 27 to 30, inclusive, 34 to 37, inclusive, $27^a$ to $30^a$ inclusive, and $34^a$ to $37^a$, inclusive, when the switch is moved to the forward position. In the forward position, the contact segments 22 and $22^a$ respectively engage contact fingers 31 and 32, and $31^a$ and $32^a$.

Coils A1, A2, B1 and B2 are connected in series-circuit relation with the motors 1, 2, 3 and 4, respectively, and are wound so that, in case of normal operation of the motors, with the current flowing in parallel through the motors 1 and 2 and the motors 3 and 4, the coils A1 and A2, and coils B1 and B2 will oppose each other and prevent the operation of differential relays A and B. In case a local circuit be formed in series through the motors 1 and 2 or the motors 3 and 4, the coils A1 and A2, or the coils B1 and B2 will be energized so as to effect the operation of one of the differential relays A and B.

Referring to Fig. 2 of the drawing, a master controller MC, embodying a contact segment $38^b$, is adapted to engage contact fingers $39^b$, $40^b$, $41^b$, 42, 43 and 44 and complete circuits from the battery $b^1$ through coils of the unit switches LS, 13, 14, 15, 16 and 17 when moved to positions $a$, $b$, $c$, $d$, $e$ and $f$. A master reverser MR, embodying contact segments 45 and 46, is adapted to engage contact fingers 47, 48 and 49 to control the operation of the operating coils $f^1$ and $r^1$ of the reversing switch RS. An interlock switch 15-cut is provided, in circuit with a coil of the unit switch 16, to prevent a short circuit being formed across the line conductors $t$ and $g$ by the simultaneous operation of the unit switches 15, 16 and 17.

The differential relays A and B are adapted to bridge contacts 50 and 51, respectively, in the circuits of the operating coils $f^1$ and $r^1$ of the reversing switch and of the coil of the line switch LS so that the above mentioned coils may be operated only when the relays A and B are released.

The system illustrated in Fig. 4 is similar to the system illustrated in Fig. 1 with the exception that the coils A1, A2, B1 and B2 are respectively placed in shunt circuit around the armatures 5, 6, 7 and 8 in place of in series circuit therewith, as shown in Fig. 1.

Assuming the system to be in the position shown in Figs. 1 and 2, with the reversing switch RS moved to its forward position, the motors may be operated in series parallel or parallel-circuit relation by moving the master controller to positions $a$, $b$, $c$, $d$, $e$ and $f$ as follows. In moving the master controller to position $a$, a circuit is completed from one terminal of the battery $b^1$ through contact finger $39^b$, controller segment $38^b$, where the circuit divides, one branch extending through contact finger 43 and the coil of the unit switch 15 to the other terminal of the battery $b^1$, and the other branch extending through contact finger $40^b$, contact fingers 48 and 49, bridged by contact segment 46, contact fingers $32^a$ and $31^a$, bridged by contact segment $22^a$, coil of line switch LS, contact terminals 50, bridged by the differential relay A, and contact terminals 51, bridged by the differential relay B to the battery $b^1$. Thus, the switches LS and 15 are operated and a circuit completed which may be traced from the supply conductor $t$ through line switch LS, resistors R1 and R2, the motors 1 and 2 and the coils A1 and A2, in parallel, unit switch 15 and the motors 3 and 4 and coils B1 and B2, in parallel, to ground $g$. In positions $b$ and $c$ of the master controller, the coils of the unit switches 13 and 14 are energized to effect the short circuiting of the resistors R1 and R2.

Between the positions $c$ and $d$ of the master controller, the switches 13 and 14 are released to insert the resistors R1 and R2 in circuit with the motors, and the latter are changed from series-parallel to parallel-circuit relation by the well known shunting transition. The switch 17 is operated to exclude the motors 3 and 4 from the power circuit, switch 15 is released and switch 16 operated to place the motors in parallel-circuit relation across the line conductors $t$ and $g$ and in series with the resistors R1 and R2. In positions $e$ and $f$ of the master controller, the switches 13 and 14 are successively operated to exclude the resistors R1 and R2 from the circuit of the motors.

In case the motors are operating in a forward direction, as set forth above, and it is desired to effect dynamic braking, the master reverser MR is moved to position $r$ so that the contact segment 45 engages contact fingers 47 and 48 and contact segment 46 disengages contact with contact fingers 48 and 49. Assuming the master controller MC to be in an operating position, as, for example, position $a$, a circuit is completed from the one terminal of the battery $b^1$ through contact finger $39^b$, controller segment $38^b$, contact finger $40^b$, contact fingers 48 and 47, bridged by the contact segment 45, contact fingers 32 and 31, bridged by the contact segment 22, operating coil $f'$, contact terminals 50, relay A, contact terminals 51 and relay B to the other terminal of the battery $b^1$. The coil $f'$ is energized, and the reversing switch RS moved to its reverse position, whereby contact segments 18 to 26, inclusive, effect engagement with the contact fingers 27 to 30, inclusive, and 32 to 37, inclusive, and the contact segments $18^a$ to $26^a$, inclusive, effect engagement with the contact fingers $27^a$ to $30^a$, inclusive, and $32^a$ to $37^a$, inclusive. The circuit relation of the armature and field windings of the various motors having been changed, the motors will produce a current in opposition to the current obtained from the supply conductors $t$ and $g$. The local current thus generated flows through local circuits in series with the motors 1 and 2, and motors 3 and 4. The local circuit through the motors 1 and 2 may be traced from one terminal of the armature 5, through contact finger 28, contact segment 19, contact segment $18^a$, contact finger $27^a$, field winding 9, contact finger 27, contact segment 18, contact segment $19^a$, contact finger $28^a$ coil $A^1$, coil $A^2$, contact finger $30^a$ contact segment $21^a$, contact segment 20, contact finger 29, field winding 10, contact finger $29^a$, contact terminal $20^a$, contact terminal 21, contact finger 30 and armature 6 to the armature 5. The second local circuit, which is established through the motors 3 and 4, may be traced from one terminal of the armature 7 through contact finger 35, contact segments 24 and $23^a$, contact finger $34^a$, field winding 11, contact finger 34, contact segments 23 and $24^a$, contact finger $35^a$, coils $B^1$ and $B^2$, contact finger $37^a$, contact segments $26^a$ and 25, contact finger 36, field winding 12, contact finger $36^a$, contact segments $25^a$ and 26, contact finger 37 and armature 8 to the other terminal of armature 7.

Assuming that the field of the motor 1 is slightly stronger than that of the motor 2,—for it is impossible to build two motors whose field strengths are exactly equal,—the motor 1 will operate as a generator governed by the momentum of the vehicle and will supply current to the motor 2. For a brief period of time, the motor 2, thus supplied with energy from the motor 1, will operate as a motor. The current in the motor 2 will quickly reverse the field of this motor, however, causing this field to build up in the opposite direction. The counter-electromotive force of the armature 6 will consequently reverse and the motor 2 will soon also operate as a generator. The motors 1 and 2 thus both operating as generators connected in series relation, a heavy dynamic-braking current will flow and the velocity of the vehicle will be quickly reduced. The same result will obviously be attained if, assuming that the field strengths of the two motors were exactly equal, the field of the motor 1 happened to build up more quickly than that of the motor 2.

The coils $A^1$ and $A^2$ of differential relay A are included in series in the first local circuit traced and the coils $B^1$ and $B^2$ of the differential relay B are included in series in the second local circuit traced, and, therefore, the two differential relays A and B are operated to break the circuit through the coil of the line switch LS and the circuit through operating coils $f^1$ and $r^1$ of the reversing switch RS. Thus, it is impossible to operate the motors from the supply circuit through the line switch LS or to operate the reversing switch RS while a dynamic-braking current is flowing through the motors 1 and 2 or the motors 3 and 4.

Many modifications in the circuit connections and arrangement of apparatus and in the operation thereof may be effected within the spirit and scope of my invention, and I desire, therefore, that only such limitations shall be imposed as are indicated in the appended claims.

I claim as my invention:

1. In a system of control, the combination with a plurality of motors having armature and field windings, a supply circuit, and means to reverse the relations of said armature and field windings for effecting dynamic braking, of means inserted in the circuit of said motors for preventing the operation of said reversing means and for preventing the connecting of the motors across the supply circuit while a dynamic-braking current is flowing.

2. In a system of control, the combination with a plurality of motors having armature and field windings, and means for reversing the relations of said armature and field windings for effecting dynamic braking, of means comprising a different relay inserted in the circuit of said motors and controlled by the current flowing therethrough for preventing the operation of said reversing means while a dynamic-braking current is flowing.

3. In a system of control, the combination with a plurality of motors and means for effecting dynamic braking, of means comprising a differentially wound relay operated by the dynamic-braking current for preventing the operation of the motors in a normal manner till the braking current ceases to flow.

4. In a system of control, two motors having armature and field windings, means for normally operating said motors, means for effecting dynamic braking, and protective means comprising a relay having energizing coils respectively inserted in the circuits of said motors that may be operated solely by the braking current.

5. In a system of control, the combination with a plurality of motors and means for effecting dynamic braking, of a supply circuit and means comprising a relay having a plurality of energizing coils respectively inserted in the circuits of the various motors for preventing the connecting of the motors to the supply circuit till the dynamic-braking current ceases to flow.

6. In a system of control, the combination with a plurality of motors, a supply circuit and a line switch for connecting said motors to the supply circuit, of means for effecting dynamic braking and means controlled by the dynamic braking circuit of each of said motors for preventing the operation of said line switch while a dynamic-braking current is flowing.

7. In a system of control, the combination with a plurality of motors, a supply circuit and a line switch for connecting said motors to the supply circuit, of means for effecting dynamic braking and means comprising a relay having energizing coils inserted in the circuit of the various motors for preventing the operation of said line switch while a dynamic current is flowing.

8. In a system of control, the combination with a plurality of motors connected in series-parallel-circuit relation, a relay coil inserted in circuit with each of said motors, a supply circuit, and a line switch for connecting said motors to the supply circuit, of means operated by said coils for preventing the operation of said line switch in case a local circuit be formed in series through the motors.

9. In a system of control, the combination with a plurality of motors connected in series-parallel-circuit relation, a differential relay in circuit with said motors, a supply circuit and a line switch for connecting said motors to the supply circuit, of means controlled by said relay for preventing the operation of said line switch in case a local circuit is formed in series through said motors.

10. In a system of control, the combination with a supply circuit, a plurality of motors connected in series-parallel-circuit relation across said supply circuit and a differential relay having the coils thereof disposed in series with the respective motors for controlling the connection of the motors to the supply circuit.

11. In a system of control, the combination with a plurality of motors having armature and field windings, and means for reversing the relations of said armature and field windings to effect dynamic braking, of a differential relay for preventing the operating of said reversing means while a dynamic-braking current is flowing through the motors.

12. In a system of control, the combination with a plurality of motors having armature and field windings, of means for reversing the relations of said armature and field windings to effect dynamic braking, and automatic means comprising a relay having a plurality of coils for preventing the operation of said reversing means while a dynamic-braking current is flowing and for permitting the operation of the same as soon as the dynamic-braking current ceases, the coils of said relay normally forming a portion of the motor circuit.

13. In a system of control, the combination with two motors having armature and field windings, a supply circuit, a line switch for connecting said motors in series-parallel-circuit relation to the supply circuit, and a differential relay having a coil thereof connected in circuit with each of said motors, of means for reversing the relations of said armature and field windings to effect dynamic braking and means operated by said relay for preventing the operation of said line switch while a dynamic-braking current is flowing.

14. In a system of control, the combination with a plurality of motors having armature and field windings, a supply circuit, a line switch for connecting said motors in series-parallel-circuit relation to said supply circuit, and means for reversing the relations of said armature and field windings to effect dynamic braking, of a differential relay adapted to control the operation of said line switch, a coil of said relay being disposed in series circuit with each of said motors, whereby the relay is operated to preclude the operation of the line switch in case a dynamic-braking current flows through the motors.

15. In a system of control, the combination with a plurality of motors having armature and field windings to effect dynamic braking and means comprising a differential relay for preventing the operation of said reversing means while a dynamic-braking current is flowing and for permitting the immediate operation of the same when the braking current ceases to flow.

16. In a system of control, the combination with a plurality of motors and means for effecting dynamic braking under predetermined conditions, of means comprising differentially wound coils in the circuits of the respective motors and operated by the dynamic braking currents for preventing the operation of the motors in a normal manner until the braking current ceases to flow.

17. The combination with a pair of electric motors connected in a common circuit to a source of energy, of means for disconnecting said circuit from said source, means for dynamically braking said motors, and means for preventing reconnecting said circuit to said source until the dynamic-braking current ceases to flow.

In testimony whereof I have hereunto subscribed my name this 30th day of March, 1916.

JOHN A. CLARKE, Jr.